April 19, 1960
A. E. DOUYARD
2,933,214
PRESSURE VESSEL
Filed March 11, 1955
3 Sheets-Sheet 1
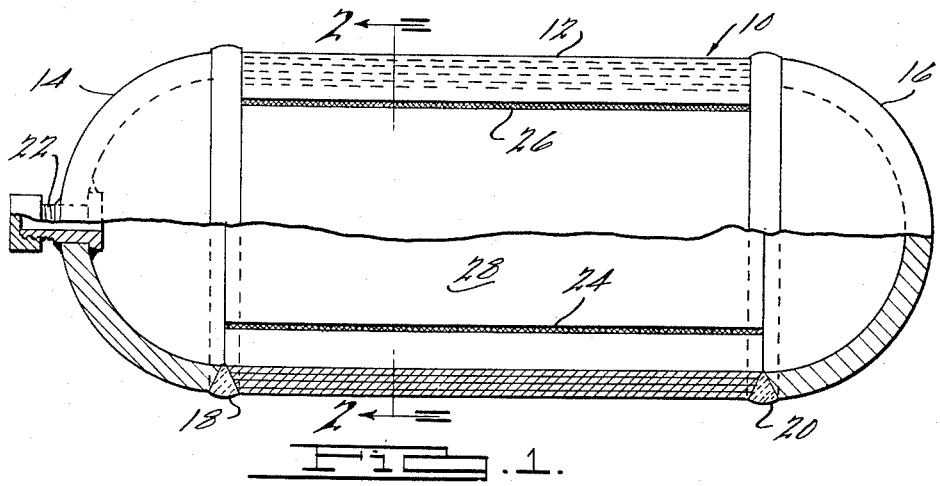
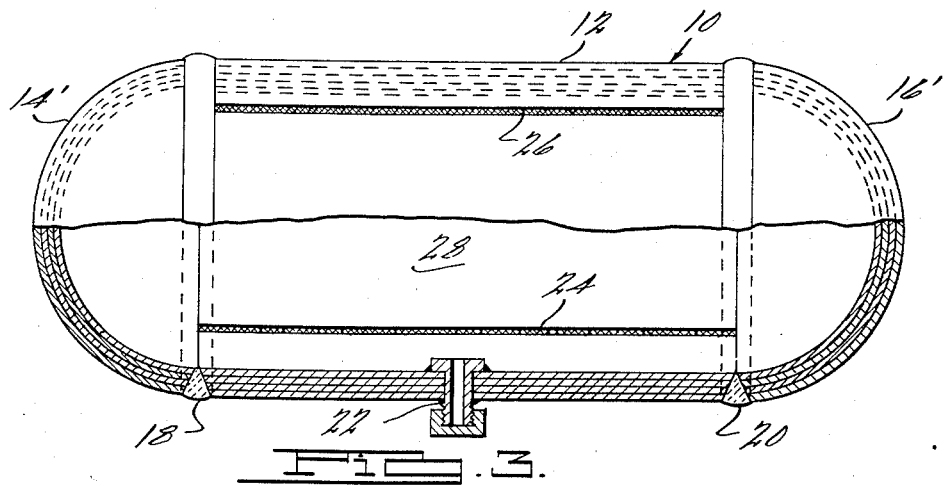
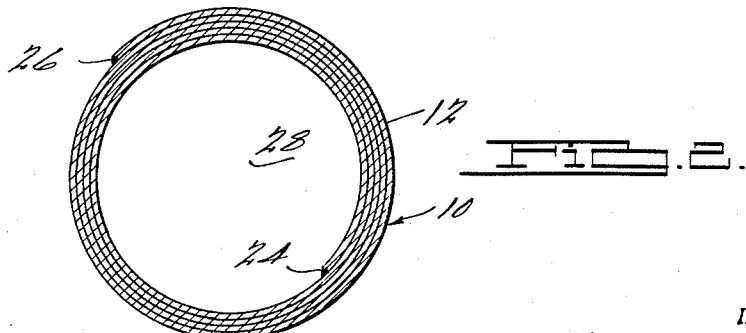
INVENTOR.
Arthur E. Douyard
BY
Harness and Harris
ATTORNEYS April 19, 1960     A. E. DOUYARD     2,933,214
PRESSURE VESSEL
Filed March 11, 1955     3 Sheets-Sheet 2

INVENTOR.
Arthur E. Douyard.
BY
Harness and Harris
ATTORNEYS

April 19, 1960     A. E. DOUYARD     2,933,214
PRESSURE VESSEL
Filed March 11, 1955     3 Sheets-Sheet 3
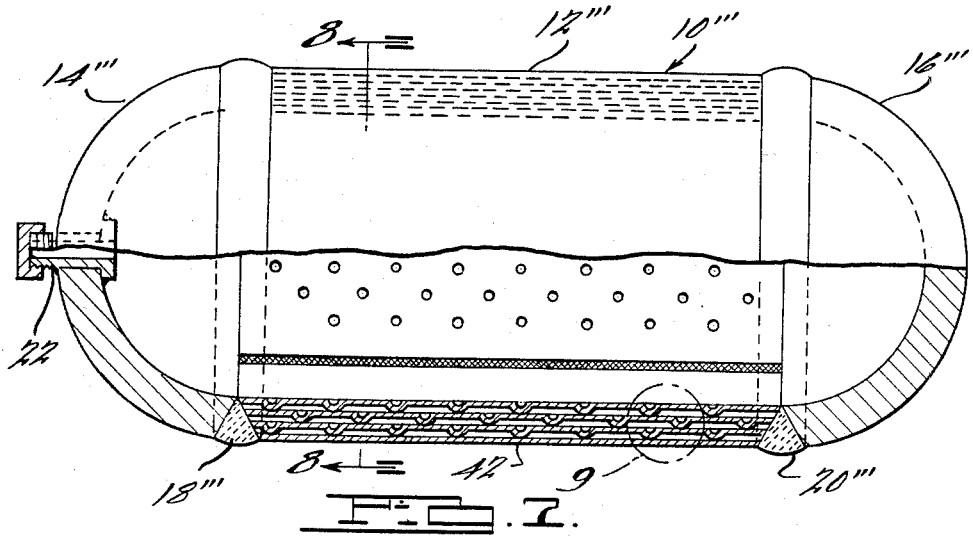
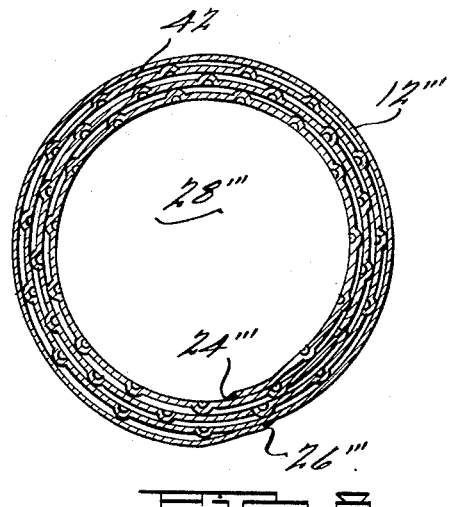
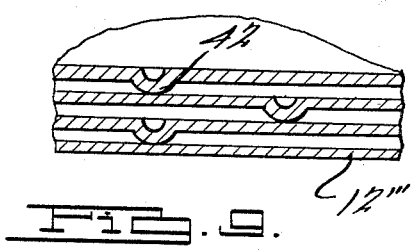
INVENTOR.
Arthur E. Douyard
BY
Harness and Harris
ATTORNEYS

United States Patent Office 2,933,214
Patented Apr. 19, 1960

2,933,214

PRESSURE VESSEL

Arthur E. Douyard, Royal Oak, Mich., assignor to Chrysler Corporation, Highland Park, Mich., a corporation of Delaware Application March 11, 1955, Serial No. 493,591

3 Claims. (Cl. 220—3)

The invention relates to an improved pressure vessel having laminated wall structure and to a method of fabricating such a pressure vessel.

It is a principal object of this invention to provide a vessel capable of storing fluids under high pressure and to provide such a vessel that has a minimum of shattering characteristics. This is accomplished by providing a laminated wall structure for the pressure vessel which is formed by rolling up a sheet of metal to form a wall structure of plural layers of material and then applying header structures to the respective exposed ends of the wall structure to define a closed container.

The laminated wall structure may be made of any desired thickness by varying the number of layers of material and the thickness of the sheet of metal. Laminated wall structure is desirable for the layers can be deformed to a point within their elastic limit to absorb more of the energy of a colliding object such as a projectile than would be absorbed by a solid container of the same weight and material. There would, therefore, be occasions where the laminated wall structure would successfully prevent complete penetration of the wall by a projectile especially if the projectile had a reduced velocity as a result of its prior penetration of some other object. Similarly, the laminated wall structure could, in many cases, successfully resist penetration by flying particles of adjacently stored pressure vessels or miscellaneous flying parts such as might be encountered in aircraft subjected to gun fire.

A further advantage of the use of a laminated wall structure resides in the fact that if the vessel does explode the laminations will provide fragments of less mass than would be provided by an exploding vessel having solid walls.

It is a further object of the invention to provide spacer means between adjacent layers of the sheet metal forming the wall structure of the vessel. This spacer means will permit deflection of the sheet metal layers to occur in stages and thus further improve the non shattering characteristics of the pressure vessel. The spacer means may take many forms, some of which are yieldable material, a woven material, or projections struck up from the sheet metal.

It is an additional object of this invention to provide an improved method of fabrication of a pressure vessel having the desirable characteristics described herein.

In the drawings:

Fig. 1 is a partial horizontal section of one form of my improved pressure vessel;

Fig. 2 is a vertical section taken on the line 2—2 of Fig. 1;

Fig. 3 is a partial horizontal section of a pressure vessel similar to that illustrated in Fig. 1 and having laminated end headers;

Fig. 7 is a partial horizontal section of a modified form of pressure vessel;

Fig. 8 is a vertical section taken on the line 8—8 of Fig. 7; and

Fig. 9 is an enlarged fragmentary view of a portion of the wall structure of Fig. 7.

Figure 4:
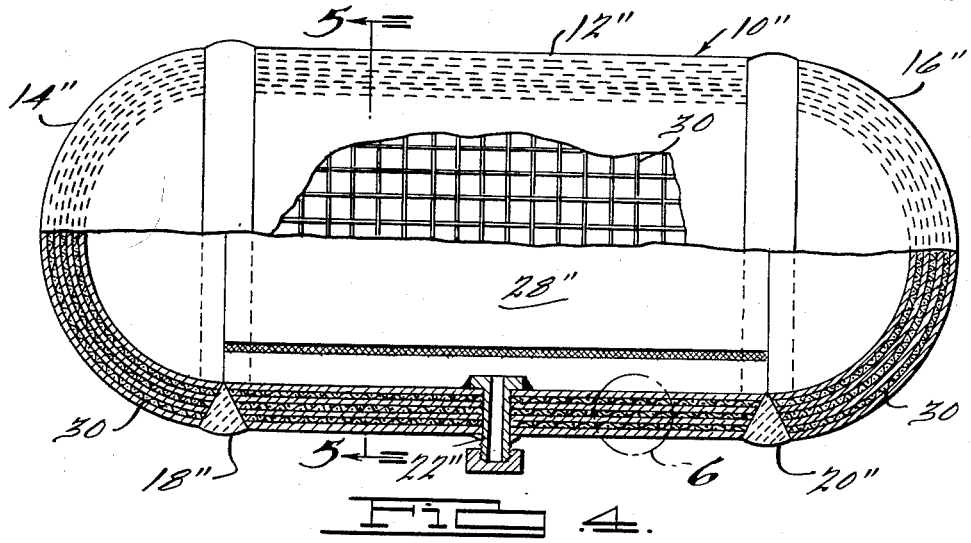
Fig. 4 is a partial horizontal section of a pressure vessel having a layer of woven material interposed between adjacent layers of sheet metal.

A pressure vessel 10 is illustrated in Figs. 1 and 2 as including a cylindrical wall structure 12 and first and second end headers 14 and 16 welded respectively at 18 and 20 to the exposed ends of the wall structure 12 to define a closed container capable of withstanding high internal pressures. A capped, threaded fitting or spud 22 is illustrated as penetrating the header 14 to accommodate insertion and withdrawal of fluid under pressure from the container 10. The particular location of the spud 22 forms no part of this invention and it will be noted that in Fig. 3 the spud 22 is located in the side wall structure 12.

The side wall structure 12 is formed of a single sheet of metal having a leading edge 24 and a trailing edge 26. The sheet of metal is rolled into a cylindrical form to create wall structure of plural layers of sheet metal and the leading edge 24 and trailing edge 26 are respectively welded to adjacent layers of the sheet of metal thereby providing a cylindrical wall structure defining an internal cavity 28. End headers 14 and 16 are illustrated as having a hemispherical contour altho it is to be understood that they could be flat or have any desired configuration provided that they present a surface which will register with the exposed ends of the wall structure 12 to accommodate bonding of the headers 14 and 16 to the wall structure 12 at 18 and 20.

In Fig. 3 a pressure vessel is illustrated that corresponds to the illustration of Fig. 1 with but two exceptions. The exceptions are that the spud 22 is illustrated as penetrating the side wall structure rather than an end header and that the end headers, which are designated by the numerals 14' and 16', are provided with a laminated construction formed by superimposing plural layers of sheet metal on each other and forming them to the desired shape. The end headers 14' and 16' are welded to the wall structure 12 at 18 and 20 in the manner described above in connection with Fig. 1 and the leading and trailing edges 24 and 26 are respectively welded to an adjacent layer of the sheet metal. The weld at 24 should be adequate to provide a gas tight joint.

Figure 5:
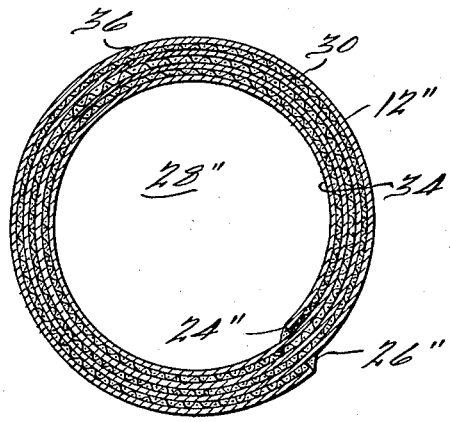
Fig. 5 is a vertical section taken on the line 5—5 of Fig. 4.
Figure 6:
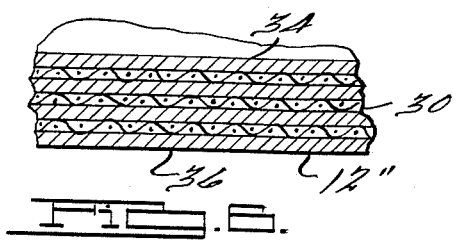
Fig. 6 is an enlarged fragmentary view of a portion of the wall structure of Fig. 4.

In Figs. 4, 5 and 6 a modified form of pressure vessel is illustrated in which a layer of spacer material 30 is interposed between layers of sheet metal in a wall structure 12" and in end headers 14" and 16". The material 30 is illustrated in Figs. 4, 5 and 6 as a woven material such as screen although it is to be understood that other spacer materials such as fibre glass cloth could be substituted therefor. Fig. 6 is an enlarged view of a section of wall structure designated by the circle 6 in Fig. 4.

The wall structure 12" of Figs. 4, 5 and 6 is formed of a single sheet of material having a leading edge 24" and a trailing edge 26". The sheet of material has a layer of spacer material 30 superimposed thereon and preferably bonded thereto. The assembled layer of sheet material and spacer material are then rolled to form the wall structure 12" of alternate layers of sheet metal and spacer material 30. An inner layer 34 of the sheet material defines an inner surface of the container and an internal cavity 28". The sheet material is preferably of greater length than the spacer material so that continuous wrapping will leave an outer portion of the sheet material exposed to form an outer surface 36 of the side wall structure 12". The leading edge 24" and the trailing edge 26" are welded to adjacent layers of the sheet material. The weld at 24" should be adequate to form a gas tight joint and end header structures 14" and 16" are welded to the exposed ends of the wall structure 12" at 18" and 20".

The end headers 14" and 16" of Fig. 4 are formed of plural layers of sheet material and spacer material 30 and although they are illustrated as having a hemispherical shape other contours may be used provided that a portion of the end headers are in registry with the exposed ends of the wall structure for welding thereto. The end headers 14" and 16" may be formed by assembling and bonding, if desired, plural layers of sheet metal and spacer material, and then forming them to the desired contour such as a hemispherical contour.

In Figs. 7, 8 and 9 a modified form of pressure vessel 10''' is illustrated. The pressure vessel 10''' includes a cylindrical side wall structure 12''' and end headers 14''' and 16''' which are welded to the exposed ends of the wall structure 12''' at 18''' and 20'''.

Fig. 9 illustrates a portion of the wall structure 12''' which comprises an enlargement of the wall structure as indicated by the circle 9 in Fig. 7. This form of the invention resembles the form described in connection with Fig. 1 with the exception that a layer of sheet metal has a plurality of bumps or depressions 42 formed therein and the sheet metal is rolled as described in connection with Fig. 1 to form a wall structure of a plurality of layers of sheet metal with the bumps 42 serving to space adjacent layers of the sheet metal from each other. The sheet metal has a leading edge 24''' and a trailing edge 26''' which are welded respectively to adjacent layers of the sheet metal to define an internal cavity 28'''. The weld at 24 should be adequate to provide a gas tight joint.

As mentioned above the end headers 14''' and 16''' are welded at 18''' and 20''' to the exposed ends of the laminated wall structure 12'''. If desired, the end headers 14''' and 16''' may be formed of laminations resembling the wall structure 12''' of Fig. 7.

The pressure vessels described herein are formed by a method which has been briefly referred to, but which involves the steps of wrapping a continuous sheet of metal to form a wall structure of plural layers of the sheet material; respectively bonding a portion of the inner and outer layers of sheet of metal to adjacent layers thereof; and bonding the end headers to the exposed ends of the wall structure to form a closed container capable of withstanding high internal pressures.

In the case of the Fig. 4, 5 and 6 form of the invention there is one departure from the method described in the preceding paragraph in that the layer of spacer material 30 is assembled with the sheet of metal and the superimposed layer of spacer material and sheet metal are then wrapped to form a laminated wall structure of alternate layers of sheet metal and spacer material. End headers are then bonded to the exposed ends of the wall structure. The sheet metal used in forming the device of Figs. 7, 8 and 9 must, of course, be provided with indentations or spacer means prior to wrapping the sheet metal to form the laminated wall structure.

I claim:

1. A vessel for storing fluid under pressure comprising laminated side wall structure and first and second end headers cooperating to define a closed container, said side wall structure being formed of a single sheet of metal and a layer of woven material bonded thereto to define a wall material, said wall material being continuously wrapped to form a wall structure of plural alternate layers of sheet metal and woven material with an inner layer of said sheet metal defining the inner surface of said container and an outer layer of said sheet metal defining the outer surface of said container, said inner layer of said sheet metal being bonded to the adjacent layer thereof and said outer layer of sheet metal being bonded to the adjacent layer thereof, and said headers being welded to the exposed ends of said wall structure to define a closed container capable of withstanding high internal pressures.

2. A vessel for storing fluid under pressure comprising side wall structure and first and second end header structures cooperating to define a closed container, each of said structures being formed of a plurality of laminations, said laminations comprising alternate layers of sheet material and screen material, the laminations of said side wall structure being arranged in continuously wrapped relationship with an inner layer of said sheet material defining the inner surface of said container and an outer layer of said sheet material defining the outer surface of said container, said inner layer of said sheet material being bonded to an adjacent layer thereof and said outer layer of sheet material being bonded to an adjacent layer thereof, and said header structures being bonded to the exposed ends of said wall structure to define a closed container capable of withstanding high internal pressures.

3. A vessel for storing fluid under pressure comprising side wall structure and first and second end header structures cooperating to define a closed container, each of said structures being formed of a plurality of laminations, said laminations comprising alternate layers of sheet metal and screen material with said sheet metal having at least one surface bonded to said screen material over substantially the entire registering surfaces of said sheet metal and screen material, the laminations of said side wall structure being arranged in continuously wrapped relationship with an inner layer of said sheet metal defining the inner surface of said container and an outer layer of said sheet metal defining the outer surface of said container, said inner layer of said sheet metal being bonded to the adjacent layer thereof and said outer layer of sheet metal being bonded to the adjacent layer thereof, and said headers being welded to the exposed ends of of said wall structure to define a closed container capable of withstanding high internal pressures.

References Cited in the file of this patent

UNITED STATES PATENTS

| | | |
|---|---|---|
| Re.22,251 | Stresau | Jan. 12, 1943 |
| 159,433 | Matthews | Feb. 2, 1875 |
| 1,453,516 | Payson | May 1, 1923 |
| 1,688,762 | Steenstrup | Oct. 23, 1928 |
| 1,927,255 | Brown | Sept. 19, 1933 |
| 2,179,057 | Schuetz | Nov. 7, 1939 |
| 2,331,504 | Raymond | Oct. 12, 1943 |
| 2,635,330 | Fentress | Apr. 21, 1953 |